United States Patent Office 2,781,202
Patented Feb. 12, 1957

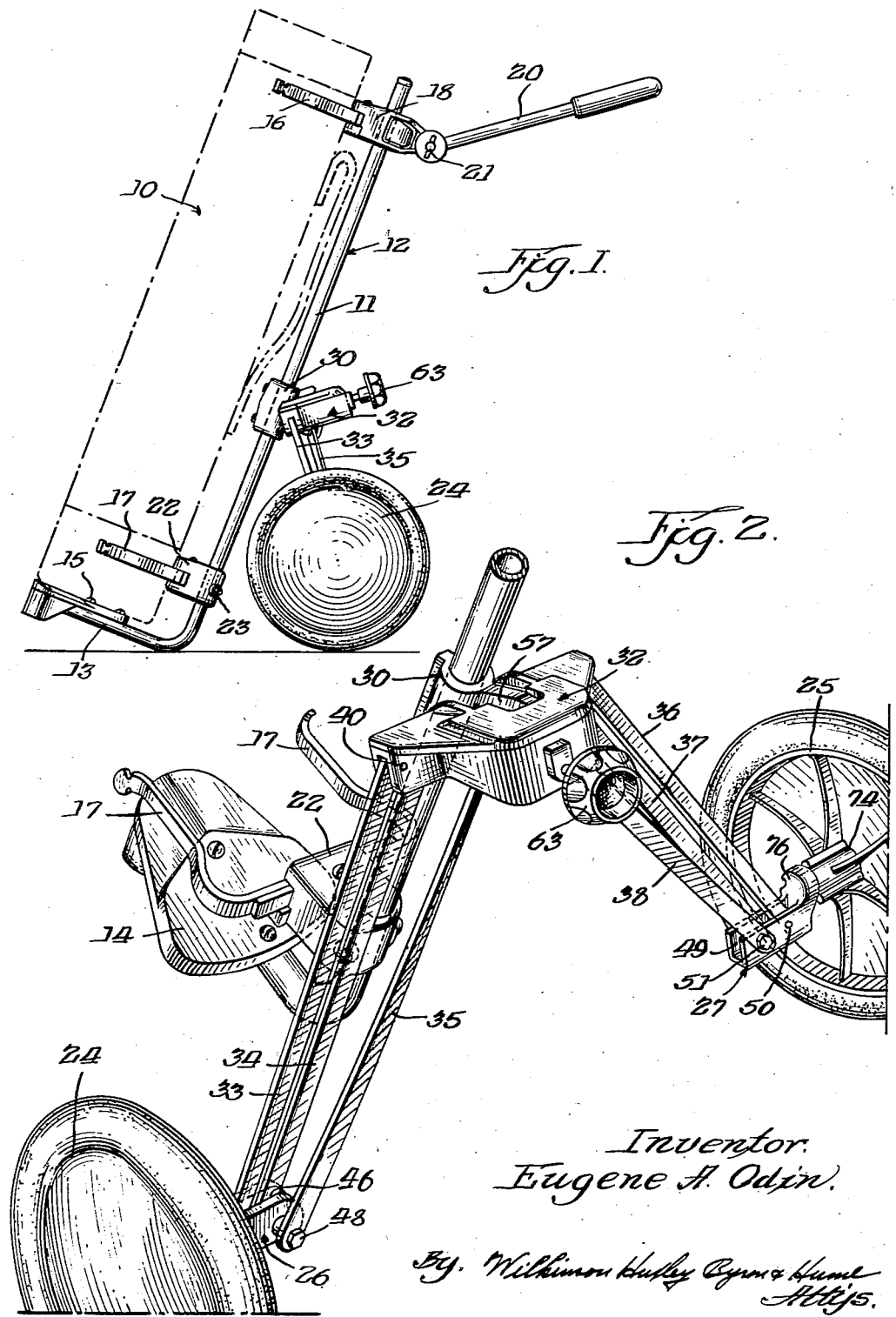

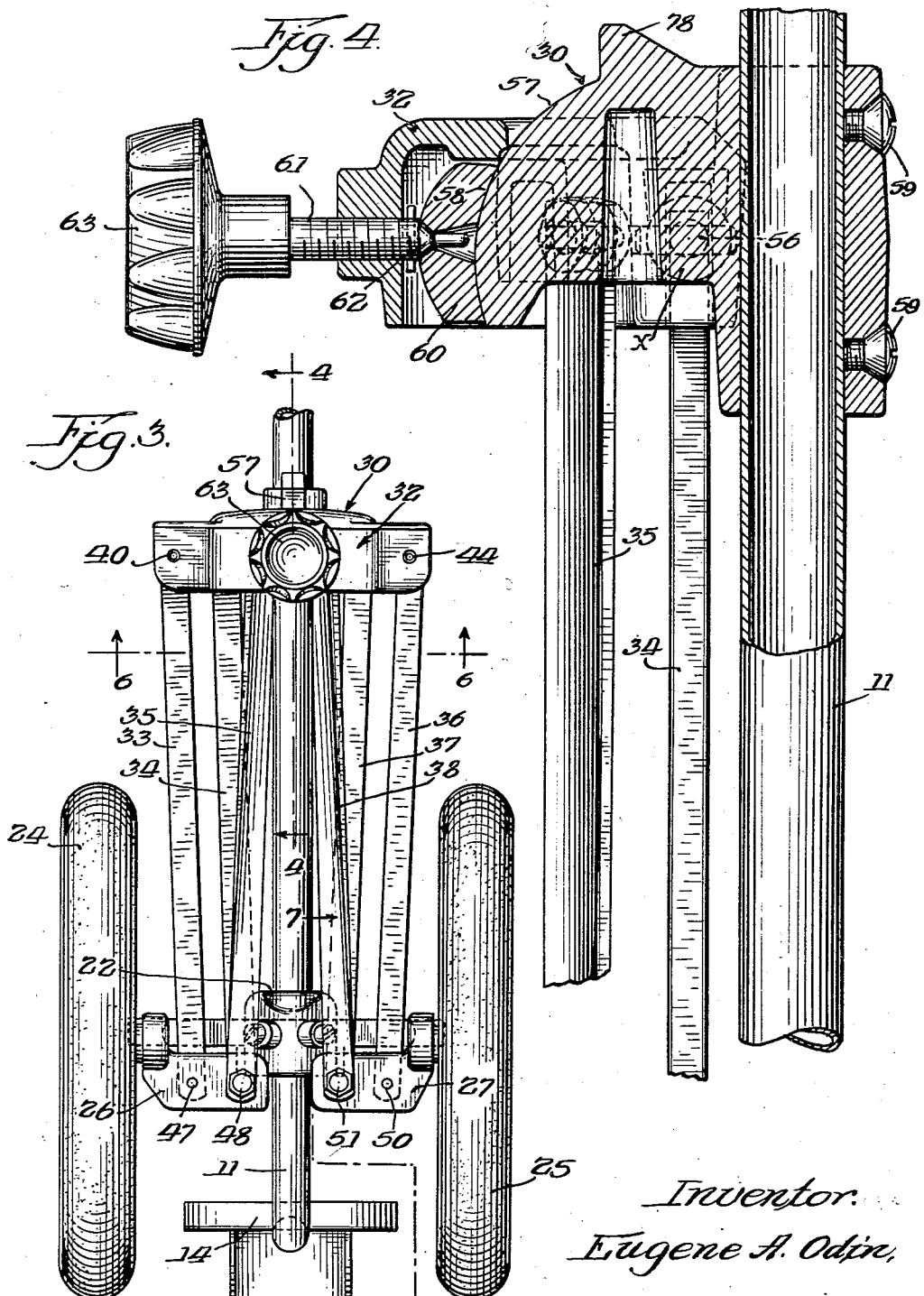

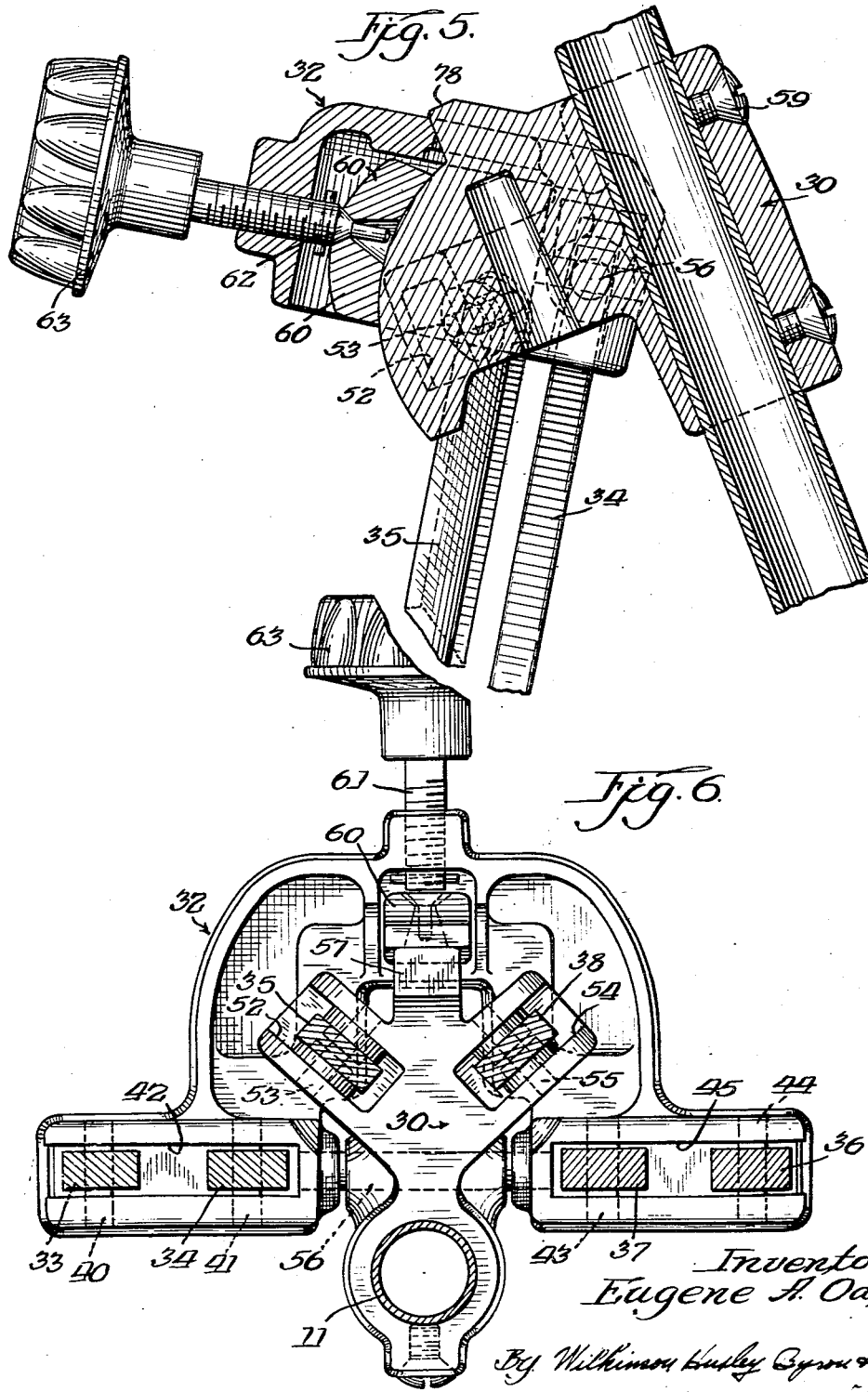

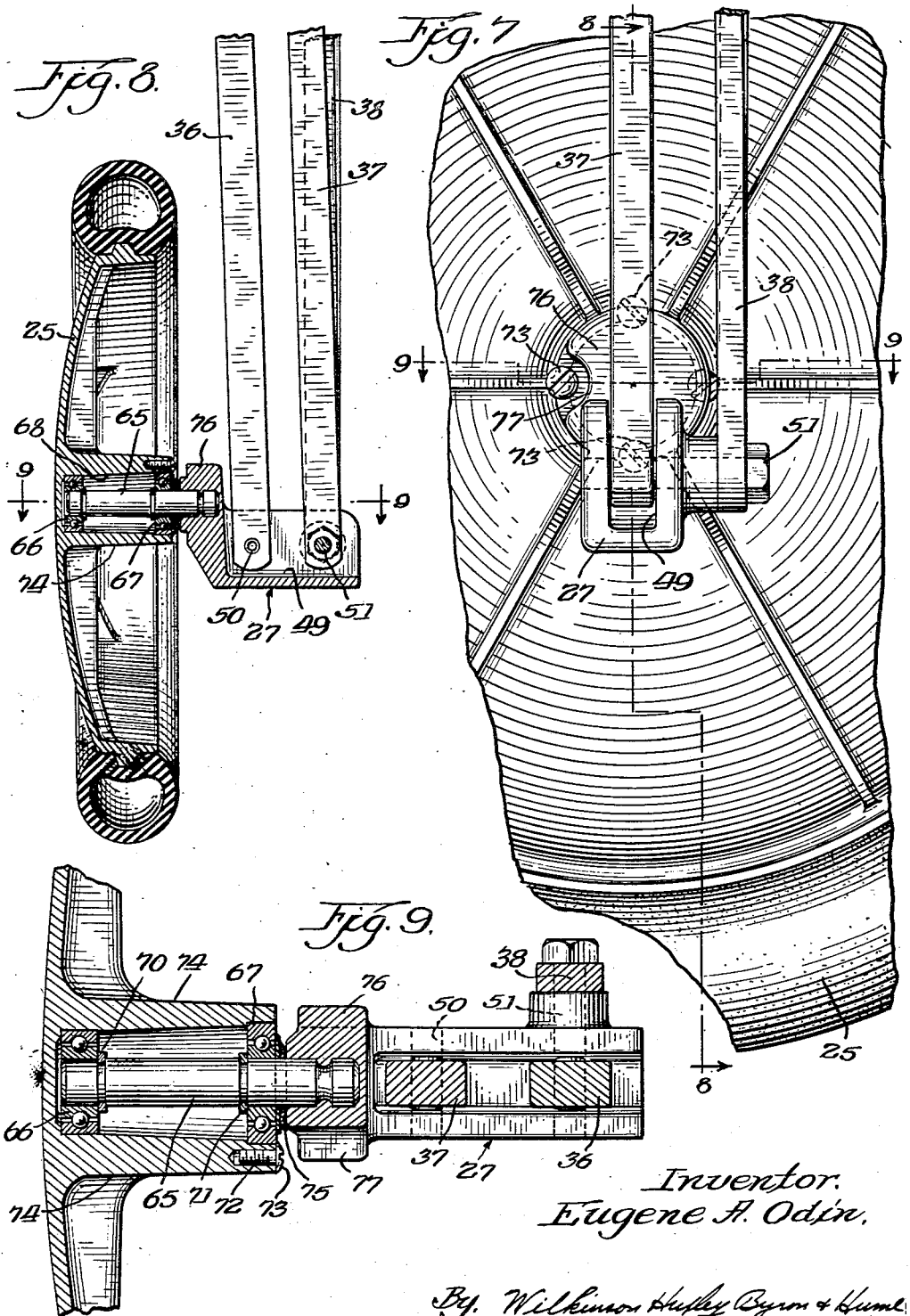

2,781,202

COLLAPSIBLE GOLF CART

Eugene Alonzo Odin, Chicago, Ill., assignor to The Louis Johnson Products Co., Inc., Highland Park, Ill., a corporation of Illinois Application July 22, 1955, Serial No. 523,791

10 Claims. (Cl. 280—42)

The invention relates to golf carts and has reference in particular to an improved cart of this character having novel structure for journalling the wheels of the cart and which can be extended or collapsed with the said structure being conveniently locked in both of said positions.

An object of the invention is to provide a golf cart of the type having collapsible wheel structure which journals a pair of wheels in an improved manner, and wherein the structure is so designed as to be operative for wheeling the cart when in a collapsed condition as well as when the wheels are extended, and which additionally incorporates pivot brackets capable of relative movement whereby to permit said collapsing and extending action of the wheels, one of said pivot brackets carrying a threaded knob for locking the pivot brackets in selected rotative positions whereby to lock the structure with the wheels either extended or collapsed.

Another and more specific object of the invention is to provide collapsible wheel structure for a golf cart which will essentially consist of a stationary pivot bracket and a movable pivot bracket with strut members connecting said brackets to wheel and axle assemblies, and wherein certain of the strut members have a pivotal connection with the movable pivot bracket, whereas other strut members have a pivotal connection with the stationary pivot bracket.

Another object is to provide collapsible wheel structure for a golf cart characterized in that the movable pivot bracket is journalled by the stationary pivot bracket and wherein each wheel and axle assembly has pivotal connection with three strut members which pivotally connect at their opposite ends with the said pivot brackets, two of said strut members having connection with the movable bracket, whereas the third strut member has connection with the stationary bracket.

A further object is to provide a golf cart of the collapsible type having a unique bracket arrangement for supporting wheel and axle assemblies by means of pivoted strut members and which can be locked in either extended or collapsed position by threaded means carried by the movable bracket of said arrangement and operative for locking the same to the stationary bracket thereof.

Another object of the invention resides in the provision of a collapsible golf or caddy cart characterized by an improved wheel and axle assembly which gives a streamlined appearance to the wheels since external hub caps are eliminated, and wherein access to the journalling structure for each wheel for mounting or for releasing the same is had from the inside face thereof.

Another object is to provide a collapsible golf cart of improved design which will be rugged in construction although streamlined in appearance, wherein the essential parts can be made cheaply of easily obtainable materials and which can be made of relatively light sections because of their shape, and a cart that can be economically produced by conventional manufacturing procedures.

With these and various other objects in view, the invention may consist of certain novel features of construction and operation as will be more fully described and particularly pointed out in the specification, drawings and claims appended thereto.

In the drawings, which illustrate an embodiment of the invention, and wherein like reference characters are used to designate like parts—

Figure 1 is an elevational view of the golf cart of the invention illustrating an operative position of the same with a golf bag being supported thereby and with the handle extended;

Figure 2 is a fragmentary perspective view of the cart illustrating improved features of the collapsible wheel structure and which is shown with the wheels extended;

Figure 3 is a fragmentary rear elevational view of the wheel structure as shown in Figure 2, but illustrating the position of the parts when the wheels are collapsed;

Figure 4 is a vertical sectional view taken along line 4—4 of Figure 3;

Figure 5 is a vertical sectional view similar to Figure 4 but showing the parts in the position they assume when the wheels are extended;

Figure 6 is a horizontal sectional view taken substantially along line 6—6 of Figure 3;

Figure 7 is a fragmentary vertical sectional view taken substantially along line 7—7 of Figure 3 and illustrating improved features of the wheel and axle assemblies of the invention;

Figure 8 is a vertical sectional view taken along line 8—8 of Figure 7, the same more clearly illustrating the wheel supports for journalling the wheels of the cart; and Figure 9 is a horizontal sectional view taken substantially along line 9—9 of Figure 8.

The embodiment of the invention selected for illustration is best shown in Figure 1 wherein a golf bag such as 10 has supported relation on the elongated frame 11 of the golf cart which is indicated in its entirety by numeral 12. The said frame 11 is preferably formed of aluminum or other light metal and the angular bent portion 13 at the base thereof has suitably secured thereto the foot member 14 as by means of screws 15, the said foot member providing a bag rest for the bag 10. Additional supports and positioning members for the bag are provided by the upper and lower arms 16 and 17, respectively. The upper arms 16, having location on respective sides of the bag 10, are suitably held in proper spaced relation by the upper clamp 18 fixed to the frame 11. The clamp 18 provides the conventional ratchet face to which is suitably secured the handle 20. The handle can be locked in any desired elevated position or it can be locked in a down position by manipulation of the wing nut 21. The lower arms 17, also having location on the respective sides of the bag, are held in spaced relation, as best shown in Figure 2, by the lower clamp 22 and which is fixed to the elongated frame 11 in any desired manner as by means of set screws 23.

The golf cart is provided with a pair of wheels 24 and 25 which are preferably rubber tired to facilitate rolling action of the wheels over the terrain of a golf course, and in accordance with the invention the wheels may be extended into spaced relation with the elongated frame 11, as shown in Figure 2, or said wheels may be moved into a collapsed position, as shown in Figure 3, wherein the wheels have location relatively adjacent the elongated frame 11. For this purpose the wheel supports 26 and 27, respectively, are pivotally supported from brackets 30 and 32, respectively, by means of strut members identified by numerals 33, 34 and 35 for wheel support 26 and by numerals 36, 37 and 38 for the support 27. Bracket 30 provides a stationary member, being fixed to the frame 11 by the screws 59. Bracket 32 is movable relative to bracket 30, being journalled by bracket 30 in a manner to be described in detail.

With respect to strut members 33 and 34, it will be understood that said members are pivotally connected at their upper ends to movable bracket 32, the numerals 40 and 41 indicating the pivot pins for the strut members, the said strut members having location within the laterally extending recess 42 provided by the movable bracket for receiving the strut members and said pins being disposed on a substantially horizontal axis. In a similar manner the strut members 36 and 37 are pivotally secured at their upper ends within the lateral recess 45 provided by the movable bracket 32, said strut members being pivotally connected to the bracket by pins 43 and 44, respectively. At their lower ends the strut members 33 and 34 have locations within the groove 46 formed in the wheel support 26 and said strut members are each pivotally secured at this end to the support by pins such as 47 and 48, and which are also disposed on a substantially horizontal axis. As regards the strut members 36 and 37, their lower ends have location within groove 49 provided by the wheel support 27 and the said members are pivotally secured to the support by pins 50 and 51. Certain of the strut members are accordingly arranged in pairs, with a pair having location on each side of the elongated frame 11. Each pair of strut members forms a parallelogram with the movable bracket at one end thereof and with their respective wheel supports at the opposite end. Thus the pair of strut members 33 and 34 maintain a parallel relation with each other as do also the strut members 36 and 37 when the wheel supports are moved from the collapsed position, as shown in Figure 3, to the extended position as shown in Figure 2. Due to the parallelogram arrangement as described the wheels supports are maintained substantially horizontal during said movement.

In the collapsed position of the wheel and axle assemblies, the strut members 33, 34 and 36, 37 depend from the movable bracket substantially vertically and the same are disposed relatively adjacent the elongated frame 11 and substantially parallel thereto. In the extended position, as shown in Figure 2, it will be observed that the wheel and axle assemblies have been moved rearwardly as regards the elongated frame 11 and outwardly on respective sides of the frame, thus spacing the wheel and axle assemblies a predetermined distance from each other. This combination of outward and rearward movement of the wheel supports and thus the wheels journalled thereby in moving them from a collapsed to an extended position is effected by a third strut member having associated relation with each said pair of strut members and being operative to pivotally connect its respective wheel support to the stationary bracket. Accordingly, as best shown in Figures 2 and 6, the strut 35 at its upper end has location in the groove 52 provided by the stationary bracket and pin 53 serves to pivotally connect this end of strut 35 to said bracket. The lower end of strut 35 is pivotally connected to the wheel support 26 through the instrumentality of the pin 48 and thus this end of the strut is pivoted on the same axis as the lower end of strut 34. In a similar manner strut 38 at its upper end has location in groove 54 provided by the stationary bracket and the pin 55 pivotally joins the strut to said bracket. At the lower opposite end of strut 38 the same is pivotally connected to wheel support 27 by the pin 51 which, as previously described, functions to pivotally connect strut 37 to the same wheel support.

In moving the wheel and axle assemblies to and from their collapsed and extended positions, rotation takes place as regards the movable bracket 32 and accordingly said bracket 32 is journalled by means of the pin 56 in a manner to permit said rotation. It will be understood that the pin 56 is provided by the stationary bracket 30, said pin projecting laterally from the respective sides of the bracket and being disposed normal to the longitudinal axis of the elongated frame 11. As best shown in Figure 6, the pin 56 is in substantial alignment with the strut members 33, 34 and 36, 37. As regards the pins 40, 41 and 43, 44, the same are at right angles to pin 56 although all the pins are substantially horizontally disposed.

It is of course desirable to be able to lock the collapsible wheel structure in both collapsed and extended positions and this is accomplished according to the invention by locking the movable bracket 32 to the stationary bracket 30 in selected rotative positions of the movable bracket thereon. The stationary bracket 30 includes a cam portion 57 which provides the cam surface 58 of arcuate contour. However, cam surface 58 is eccentric as regards the axis of rotation for the movable bracket 32. In other words, the arcuate cam surface 58 has its center located at X, which is below pin 56. The movable bracket 32 carries the locking shoe 60, which is adapted to ride on cam surface 58 and engage the surface for locking the movable bracket. The threaded stem 61 has operative connection with the locking shoe 60, the coacting bevel surfaces 62 being provided to facilitate said connection and the said threaded stem having fixed thereto the handle knob 63 which is thus located for convenient access by the operator.

The wheel supports 26 and 27 each journal a wheel such as 24 and 25, respectively, and the said supports, the wheels and the journalling means have been heretofore referred to as wheel and axle assemblies. As best shown in Figures 8 and 9, the wheel support 27 has suitably fixed thereto the axle 65 which projects horizontally outwardly from the wheel support. The wheel 25 is mounted on said axle 65 for substantially frictionless rotation by means of the ball bearing assemblies 66 and 67, the ball bearing assembly 66 having location forwardly within recess 68 and bearing assembly 67 having location rearwardly. The bearings are maintained on the axle in proper spaced relation by means of the retaining washers 70 and 71, respectively, which have location adjacent the inside face of their bearing. The ball bearings and thus the wheel are held in mounted relation on axle 65 by means of a plurality of screws 72 having heads 73, which are conventionally slotted for receiving a screw driver and which, as illustrated in Figure 9, overlie the ball bearing assembly 67, thus functioning to lock the bearing assembly in place within the recess formed in the hub 74 of the wheel. A friction washer 75 is located between wheel 25 and its wheel support 27, the said washer having a bent formation so as to provide spring pressure for taking up any looseness or play which may develop between the journalling structure and the wheel support.

It will be observed from Figures 8 and 9 that the hub 74 of the wheel 25 is directed inwardly, having location on the inside face of the wheel. As a result of this structure the wheels of the present golf cart present a streamlined appearance since hub caps and the like have been eliminated from the exterior exposed face. For installing the wheels 24 and 25 on their respective axles or for removing said wheels, it is only necessary to remove the threaded screws, whereupon the ball bearing assembly 67 can be removed, which permits the wheel to be withdrawn from its axle. In order to provide convenient access to the screws 72, the face portion 76 of the wheel support is notched as at 77, the notch preferably having an arcuate contour and being formed in the periphery of the face portion 76 to a depth such as will clear the screw heads 73 as the wheel may be rotated to successively bring the slotted heads in alignment therewith.

The above description of the journalling structure for wheel 25 can be repeated for wheel 24 since the wheel support 26 will present a horizontally projecting axle on which the wheel 24 is mounted by means of ball bearings, all in a manner similar to that as described.

The action of the strut members is such as to cause pivoting of the movable bracket 32 on shaft 56 as the wheels are moved to and from a collapsed and extended position. This is due to the fact that certain strut members connect the movable bracket to the wheel supports, whereas at least one strut member for each set is so constructed and arranged as to connect its respective wheel support to the stationary bracket 30. Said strut members, which have been identified by numerals 35 and 38, are longitudinally twisted and as a result of this formation the wheels, when moved into an extended position, are caused to diverge with respect to each other and with respect to the vertical frame 11. In other words, the wheels move rearwardly away from frame 11 and also simultaneously outward to increase their spaced relation. The pivotal connection of the struts 35 and 38 with respect to their wheel supports and with respect to the fixed bracket is clearly illustrated in Figures 2, 3 and 6. As previously explained, the said struts at their lower ends are pivotally connected to their wheel supports by means of the same pins which connect struts 34 and 37, respectively. However, the struts 35 and 38 at their twisted upper ends each have an individual pivoted connection to the fixed bracket and the arrangement of said upper ends is such that they have location within recesses which extend rearwardly of the vertical frame 11 at an angle of approximately 45 degrees. The twisting of each strut member 35 and 38 is therefore about 45 degrees which is a measure of angular displacement between the pivot axis for their lower ends and the pivot axis for their upper ends. Since the twist of the said struts determines the path of movement of the wheels into their extended position, it accordingly follows that the wheels diverge in paths approximately 45 degrees rearwardly of the vertical frame 11.

When the wheels of the present golf cart are collapsed as shown in Figure 3, it is nevertheless possible to wheel the cart with the same freedom of movement as when the wheels thereof are extended as shown in Figure 2. Also when the wheels are collapsed it is possible to lock them in this position since locking is effected by rotation of the handle knob 63 to force the shoe 60 into contact with cam 57. The locked position of the parts with the wheels collapsed is shown in Figure 4, wherein it will be observed that the movable bracket 32 is approximately horizontally disposed with the elongated frame 11 being vertical. Accordingly the locking shoe 60 has contact with the bottom portion of cam 57. It will, of course, be understood that when the movable bracket 32 is locked to the stationary member 30 the strut members and wheel and axle assemblies will accordingly be locked against movement since to extend the wheels produces movement of bracket 32 as described.

The position of the brackets and associated parts with the wheels extended is illustrated in Figure 5, wherein it will be observed that the movable bracket has moved above the horizontal into an angular position, in which position the movable bracket is in contact with the stop lug 78 provided as part of the cam portion. The strut members also have an angular relation with respect to the longitudinal frame. The locking shoe 60 thus has contact with the upper portion of cam 57 and by rotation of the knob handle 63 the pressure of shoe 60 against the cam can be increased sufficiently to effect a secure and firm locking of bracket 32 to bracket 30. Contact of movable bracket 32 with the stop portion 78 determines the maximum divergent movement of the wheels in an extended position and the locking shoe 60 will hold the wheels in this maximum extended position, preventing any tendency to move into a collapsed position since the cam surface 58 is eccentric as regards the axis of rotation provided by pin 56 for the said movable bracket. This is best understood when it is realized that the curvature of the cam surface 58 is such as to increase the pressure of the locking shoe 60 against the cam portion upon downward movement of the locking shoe from its position as shown in Figure 5. In other words, the bottom portion of the cam presents a high portion against which the locking cam 60 is naturally caused to work.

The invention is not to be limited to or by details of construction of the particular embodiment thereof illustrated by the drawings, as various other forms of the device will of course be apparent to those skilled in the art without departing from the spirit of the invention or the scope of the claims.

What is claimed is:

1. In a cart of the character described, the combination including an elongated supporting frame adapted to support a golf bag, a stationary bracket fixed to the frame intermediate the length thereof, a movable bracket in associated relation with the stationary bracket and being journalled thereby, a wheel support disposed on each side of the elongated frame, a plurality of strut members pivotally connecting each wheel support to the brackets, certain of said strut members for each wheel support having pivotal connection therewith at one end and at their opposite end pivotally connecting with the movable bracket, and at least one of said strut members for each wheel support pivotally connecting the support to the stationary bracket.

2. In a cart of the character described, the combination including an elongated supporting frame adapted to support a golf bag, a stationary bracket fixed to the frame intermediate the length thereof, a movable bracket in associated relation with the stationary bracket and being journalled thereby, a wheel support disposed on each side of the elongated frame, a plurality of strut members pivotally connecting each wheel support to the brackets in a manner permitting lateral rearward movement of the wheel supports from a collapsed position adjacent the frame to an extended position spaced rearwardly of the frame, certain of said strut members for each wheel support having pivotal connection with the support at their lower ends and with the movable bracket at their upper ends, at least one of said strut members for each wheel support having pivotal connection with the support and with the stationary bracket at its ends respectively, and locking means carried by the movable bracket and operative to lock the movable bracket to the stationary bracket in selected rotative positions of the movable bracket to thus lock the wheel supports in collapsed and extended positions.

3. In a golf cart, the combination including an elongated frame, of a stationary bracket member fixed to the frame intermediate the length thereof, a movable bracket member in associated relation with the stationary member and being journalled thereby on an axis normal to the longitudinal axis of the frame, a wheel support disposed on each side of the elongated frame, a plurality of strut members pivotally connecting each wheel support to the brackets and which permit movement thereof to and from collapsed and extended positions, certain of said strut members for each wheel support having pivotal connection therewith at one end and at their opposite end pivotally connecting with the movable bracket, at least one of said strut members for each wheel support pivotally connecting the support to the stationary bracket, and locking means carried by the movable bracket and operative to lock the movable bracket to the stationary bracket in selected rotative positions of the movable bracket to thus lock the wheel supports in collapsed and extended positions.

4. In a golf cart, the combination including an elongated frame, of a stationary bracket member fixed to the frame intermediate the length thereof, a movable bracket member in associated relation with the stationary member and being journalled thereby on an axis normal to the longitudinal axis of the frame, a wheel support disposed on each side of the elongated frame, a plurality of strut members pivotally connecting each wheel support to the brackets, a wheel journalled for rotation by each wheel support, certain of said strut members for each wheel support having pivotal connection therewith at their lower ends and at their upper ends pivotally connecting with the movable bracket, at least one of said strut members for each wheel support pivotally connecting the support to the stationary bracket, a cam member provided by the stationary bracket, and a locking shoe carried by the movable bracket and operative to engage the surface of the cam member for locking the movable bracket to the stationary bracket in selected rotative positions of the movable bracket.

5. A golf cart of the character described in claim 4, wherein the shoe engaging surface of the cam member is eccentric as regards the axis of rotation for the movable bracket.

6. In a golf cart, the combination including a vertical main frame adapted to support a golf bag, a stationary bracket fixed to the frame intermediate the length thereof, said stationary bracket providing a pivot shaft which projects horizontally from respective sides of the bracket, a movable bracket in associated relation with the stationary bracket and journalled for movement with respect thereto by said pivot shaft, a wheel support disposed on each side of the vertical frame, a plurality of strut members pivotally connecting each wheel support to the brackets, at least two of said strut members for each wheel support having pivotal connection therewith at their lower ends and at their upper ends pivotally connecting with the movable bracket, and a third of said strut members for each wheel support having pivotal connection at its lower end with the support on an axis which is common to the pivot axis of one of said first mentioned strut members, and each third strut member having pivotal connection at its upper end with the stationary bracket on an axis which is angularly displaced with respect to its lower pivot axis.

7. In a golf cart, the combination including a vertical main frame adapted to support a golf bag, a stationary bracket fixed to the frame intermediate the length thereof, said stationary bracket providing a pivot shaft which projects horizontally from respective sides of the bracket, a movable bracket in associated relation with the stationary bracket and journalled for movement with respect thereto by said pivot shaft, a wheel support disposed on each side of the vertical frame, a plurality of strut members pivotally connecting each wheel support to the brackets in a manner permitting diverging rearward movement of the wheel supports from a collapsed position adjacent the frame to an extended position spaced rearwardly of the frame and return, at least two of said strut members for each wheel support having pivotal connection therewith at their lower ends and at their upper ends pivotally connecting with the movable bracket, a third of said strut members for each wheel support having pivotal connection at its lower end with the support on an axis which is common to the pivot axis of one of said first mentioned strut members, and each third strut member having pivotal connection at its upper end with the stationary bracket on an axis which is angularly displaced with respect to its lower pivot axis, and locking means carried by the movable bracket and operative to lock the movable bracket to the stationary bracket in selected rotative positions of the movable bracket to thus lock the wheel supports in collapsed and extended positions.

8. A golf cart as defined by claim 7, wherein the locking means carried by the movable bracket consists of a locking shoe, wherein a cam is provided by the stationary bracket, the surface of which is engaged by the shoe for locking the movable bracket to the stationary bracket, and wherein the cam surface thus engaged by the shoe is eccentric as regards the axis of rotation of the movable bracket.

9. In a golf cart, the combination including an elongated frame disposed approximately vertically, said frame being adapted to support a golf bag located on the forward side of the frame, a pair of wheels located rearwardly of the frame and disposed with the frame being approximately centered as regards the wheel, a wheel support for each wheel, a stationary bracket fixed to the frame intermediate its length and which projects rearwardly of the frame, a movable bracket associated with the stationary bracket and being journalled thereby for movement on a horizontal axis, a plurality of strut members pivotally connecting each wheel support to the brackets in a manner permitting diverging rearward movement of the wheels from a collapsed position adjacent the frame to an extended position spaced rearwardly of the frame and return, all of said strut members for each wheel support having pivotal connection with their wheel support on axes which are parallel with the forward-rearward center line of the cart, certain of said strut members for each wheel support having pivotal connection with the movable bracket on axes which are also parallel with the forward-rearward center line of the cart, one of said strut members for each wheel support having pivotal connection with the stationary bracket on an axis which is displaced rearwardly of the frame and about 45 degrees from said forward-rearward center line, and locking means carried by the movable bracket and operative to lock the movable bracket to the stationary bracket in selected rotative positions of the movable bracket to thus lock the wheels in collapsed and extended positions.

10. A golf cart as defined by claim 9, wherein the locking means includes a cam provided by the stationary bracket and a locking shoe carried by the movable bracket and adapted to have contact with the cam.

References Cited in the file of this patent

UNITED STATES PATENTS

| | | |
|---|---|---|
| 2,626,815 | Chamberlin | Jan. 27, 1953 |
| 2,679,402 | Sawyer et al. | May 25, 1954 |
| 2,717,785 | Ray | Sept. 13, 1955 |